United States Patent
Liu (10) Patent No.: US 9,625,643 B2
(45) Date of Patent: Apr. 18, 2017

(54) BUFFER ELEMENT AND MANUFACTURING METHOD THEREOF, BACKLIGHT MODULE, AND DISPLAY DEVICE

(71) Applicants: BOE TECHNOLOGY GROUP CO., LTD., Beijing (CN); HEFEI BOE DISPLAY LIGHT CO., LTD., Hefei, Anhui (CN)

(72) Inventor: Gang Liu, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 318 days.

(21) Appl. No.: 14/313,600

(22) Filed: Jun. 24, 2014

(65) Prior Publication Data
US 2015/0316710 A1 Nov. 5, 2015

(30) Foreign Application Priority Data

Apr. 30, 2014 (CN) .......................... 2014 1 0181412

(51) Int. Cl.
*F21V 8/00* (2006.01)
*C08K 11/00* (2006.01)
*G02F 1/1333* (2006.01)

(52) U.S. Cl.
CPC ............ *G02B 6/0088* (2013.01); *C08K 11/00* (2013.01); *G02B 6/0093* (2013.01);
(Continued)

(58) Field of Classification Search
CPC .. G02B 6/0093; G02B 6/0088; G02F 2203/21
See application file for complete search history.

(56) References Cited

U.S. PATENT DOCUMENTS

2005/0269719 A1* 12/2005 Hack ..................... H01L 23/295
257/788
2012/0037842 A1* 2/2012 Kubota ................ C01G 53/006
252/70
(Continued)

FOREIGN PATENT DOCUMENTS

CN 1301240 A 6/2001
CN 101995701 A 3/2011
(Continued)

OTHER PUBLICATIONS

First Chinese Office Action and English translation dated Dec. 18, 2015, for corresponding Chinese Application No. 201410181412.X.
(Continued)

*Primary Examiner* — Jong-Suk (James) Lee
*Assistant Examiner* — Christopher E Dunay
(74) *Attorney, Agent, or Firm* — Kinney & Lange, P.A.

(57) ABSTRACT

A buffer element and a manufacturing method thereof, a backlight module, and a display device are disclosed. When the buffer element is applied to the backlight module, the problem caused by thermal expansion of the light guide plate can be effectively solved without needing to reserve a gap in the backlight module, the relative movement of the light guide plate is avoided and the optical quality of the backlight module is improved. The buffer element comprises a buffer body, wherein the buffer body comprises a curable adhesive, and a negative thermal expansion material dispersed in the curable adhesive.

17 Claims, 10 Drawing Sheets

(52) U.S. Cl.
CPC .......... *G02F 2001/133317* (2013.01); *G02F 2203/21* (2013.01); *Y10T 428/264* (2015.01); *Y10T 428/28* (2015.01)

(56) References Cited

U.S. PATENT DOCUMENTS

| | | | | |
|---|---|---|---|---|
| 2012/0275148 | A1* | 11/2012 | Yeh | G02B 5/0808 |
| | | | | 362/235 |
| 2013/0105852 | A1* | 5/2013 | Lou | H01L 33/62 |
| | | | | 257/99 |
| 2013/0208505 | A1* | 8/2013 | Yu | G02B 6/0088 |
| | | | | 362/609 |
| 2013/0250203 | A1* | 9/2013 | Zhou | G02F 1/133608 |
| | | | | 349/58 |
| 2014/0061704 | A1* | 3/2014 | Yamada | H01L 33/62 |
| | | | | 257/98 |
| 2014/0192292 | A1* | 7/2014 | Li | G02B 6/0088 |
| | | | | 349/65 |
| 2016/0139445 | A1* | 5/2016 | Zhu | G02F 1/13394 |
| | | | | 349/106 |

FOREIGN PATENT DOCUMENTS

| | | |
|---|---|---|
| CN | 102399443 A | 4/2012 |
| CN | 102636899 A | 8/2012 |
| CN | 102901007 A | 1/2013 |
| CN | 103094463 A | 5/2013 |

OTHER PUBLICATIONS

Second Chinese Office Action and English translation dated Jun. 22, 2016, for corresponding Chinese Application No. 201410181412.X.
Third Chinese Office Action and English translation dated Nov. 1, 2016, for corresponding Chinese Application No. 201410181412.X.

\* cited by examiner

BUFFER ELEMENT AND MANUFACTURING METHOD THEREOF, BACKLIGHT MODULE, AND DISPLAY DEVICE

CROSS-REFERENCE TO RELATED APPLICATION

This application claims the benefit of Chinese Patent Application No. 201410181412.X filed on Apr. 30, 2014 in the State Intellectual Property Office of China, the whole disclosure of which is incorporated herein by reference.

BACKGROUND OF THE INVENTION

1. Field of the Invention

This disclosure relates to a display, and particularly to a buffer element and a manufacturing method thereof, a backlight module, and a display device.

2. Description of the Related Art

Backlight module is one of important components of a liquid crystal display device. A crucial part of the backlight module is a light guide plate.

Currently, most of the light guide plates are made of polycarbonate (PC) and polymethyl methacrylate (PMMA) which each has a small thermal conductivity. Since a backlight source such as a LED light source releases heat in operation, the light guide plate will be expand and deformed when heated by the accumulated heat. However, since the light guide plate is constrained by a member for controlling a size such as a frame, it is difficult for the light guide plate to be deformed and extended in a direction of a plate plane. Therefore, the light guide plate will be warped and thus parts such as optical film and sheet will be warped so that normal displaying of a display device is adversely affected and picture quality is reduced.

Furthermore, currently the entire backlight module trends to thin so that a thickness of the light guide plate is also decreased continually. The thickness of the light guide plate is often decreased up to 0.2-0.4 mm. Therefore, the light guide plate is warped more seriously when heated.

For the above problem, a current method for addressing bad thermal stability of the light guide plate in the backlight module is mainly to reserve a gap as an expansion space for the light guide plate in the backlight module, so that there is a space for the light guide plate to be extended therein after being expanded when heated. In this way, the warp of the light guide plate is alleviated.

Such a design alleviates the problem caused by thermal expansion of the light guide plate to a certain degree. However, since the light guide plate is positioned by a member such as a frame, a gap needs to be reserved for the light guide plate in the prior art. In this case, because of existence of the gap, the light guide plate is movable in an up-down direction and a left-right direction so that the optical quality of the backlight module fluctuates and thus the quality of the backlight module is reduced.

In addition, if the backlight module is vibrated during transportation and when suffering an external force, the backlight module and the other parts in the backlight module will collide with and scratch each other since the light guide plate is in a movable state inside the backlight module. As a result, the quality of the backlight module is adversely affected.

SUMMARY OF THE INVENTION

According to embodiments of the present invention, there is provided a buffer element and a manufacturing method thereof, a backlight module, and a display device. When the buffer element is applied to the backlight module, the problem caused by thermal expansion of the light guide plate can be effectively solved without needing to reserve a gap in the backlight module, the relative movement of the light guide plate is avoided and the optical quality of the backlight module is improved.

In accordance with a first embodiment of the present invention, there is provided a buffer element comprising a buffer body, wherein the buffer body comprises a curable adhesive, and a negative thermal expansion material dispersed in the curable adhesive.

In accordance with a second embodiment of the present invention, there is provided a manufacturing method of a buffer element comprising a buffer body, wherein the buffer body is formed by the steps of: dispersing a negative thermal expansion material in a curable adhesive; filling into a mold the curable adhesive with the negative thermal expansion material, and curing the curable adhesive; and separating the cured curable adhesive from the mold to obtain the buffer body.

In accordance with a third embodiment of the present invention, there is provided a backlight module comprising a back plate, and a light guide plate disposed above the back plate, wherein the light guide plate comprises at least one non-light incident side and the backlight module further comprises the abovementioned buffer element, wherein the buffer element is disposed adjacent to the at least one non-light incident side of the light guide plate and is in contact with the at least one of the non-light incident side of the light guide plate.

In accordance with a fourth embodiment of the present invention, there is provided a display device comprising the abovementioned buffer element or the abovementioned backlight module.

The reference numerals in the drawings are listed as follows:

01—buffer element; 10—buffer body; 101—(UV) curable adhesive; 102—negative thermal expansion material; 103—light reflection layer; 104—(transparent) adhesive layer; 110—first sidewall; 120—second sidewall; 02—light guide plate; 02a—non-light incident side; 02b—bottom surface; 02c—top surface; 03—frame; and 04—light source.

DETAILED DESCRIPTION OF THE EMBODIMENTS

A further description of the invention will be made in detail as below with reference to embodiments of the present invention taken in conjunction with the accompanying drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of the present invention, there is provided a buffer element and a manufacturing method thereof, a backlight module, and a display device. The buffer element comprises a buffer body. The buffer body comprises a curable adhesive, and a negative thermal expansion material dispersed in the curable adhesive. Some components expand when heated and contract when cooled so that they will be deformed. The buffer element can avoid the adverse influence of deformation on these components and is always in a state where the buffer element is fitted with the components to be protected.

In this way, in the backlight module to which the buffer element is applied, after an ambient temperature in the backlight module rises, the buffer element contracts because it is heated and thus decreases in volume. A gap is equivalently generated in the backlight module. The volume of the gap is substantially equal to a volume ΔV by which the buffer element decreases in volume. As a result, after the light guide plate expands when heated and thus increases in volume, the gap ΔV generated by the contraction of the buffer element can provide a space for the light guide plate to be deformed and extended therein due to expansion of the light guide plate. The buffer element avoids warp of the light guide plate due to constraint of the frame on the light guide plate so as to effectively improve the thermal stability of the entire backlight module. In addition, when the buffer element is applied to the backlight module, it is in contact with the light guide plate. In other words, the position of the light guide plate in the backlight module is relatively fixed so that the light guide plate cannot move in the up-down direction and left-right direction. As a result, the buffer element avoids the fluctuation of the optical quality of the backlight module. Therefore, the problem caused by thermal expansion of the light guide plate is effectively solved without needing to reserve a gap in the backlight module, the relative movement of the light guide plate is avoided and the optical quality of the backlight module is improved.

A further description of the invention will be made in detail as below with reference to embodiments of the present invention taken in conjunction with the accompanying drawings. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In some embodiments, as shown in FIGS. 1-4, a buffer element 01 comprises a buffer body 10. The buffer body 10 comprises a curable adhesive 101, and a negative thermal expansion material 102 dispersed in the curable adhesive 101.

As well known, most of the solid materials will expand when heated and contract when cooled if the ambient temperature is changed. In other words, they will increase in volume when heated. In contrast, the negative thermal expansion material 102 will contract when heated and expand when cooled if the ambient temperature is changed. In other words, the negative thermal expansion material 102 will decrease in volume when heated and increase in volume when cooled.

However, the negative thermal expansion material 102 is usually a granular material or a powder material. If the granular material or powder material alone is used as a buffer element, it cannot be fitted with the material to be protected. For example, if the negative thermal expansion material 102 is used directly in the backlight module, small particles may be introduced into the backlight module so that foreign body will appear in the picture displayed in the display device and the display effect is adversely affected.

Therefore, in the buffer element 01 according to the embodiments of the present invention, the negative thermal expansion material 102 is fixed by the curable adhesive 101 to avoid introduction of the foreign matter or the powder into the backlight module and thus its adverse influence on the optical quality.

The specific shape of the buffer body 10 can be flexibly adjusted according to a size of the light guide plate or sizes of other sheets such as a reflection sheet or a dispersing sheet of the backlight module (to which the buffer element 01 is applied) or a size of the display device. The specific shape of the buffer body 10 is not limited in the embodiments of the present invention. Herein, only FIGS. 1-4 are taken as an example and provide several possible shapes of the buffer body 10 of the buffer element 01 as described below.

Figure 1:
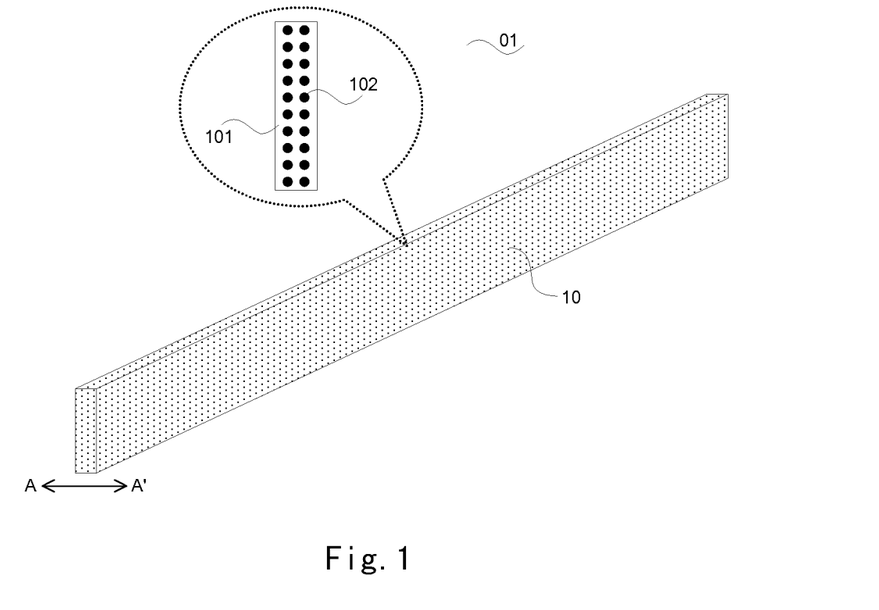
FIG. 1 is a schematic view showing a structure of a buffer element according to a first embodiment of the present invention.

Referring to FIG. 1, the buffer body 10 may be in a shape of an elongated strip and the cross section of the buffer body taken in the A-A' direction in FIG. 1 as shown by the broken line is in a shape of an elongated strip.

Figure 2:
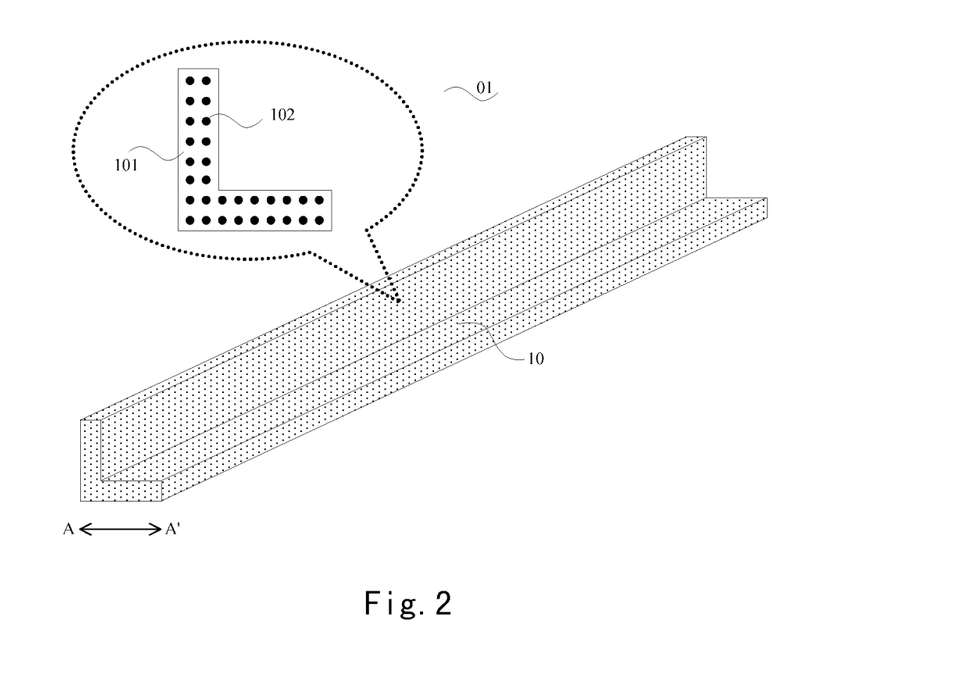
FIG. 2 is a schematic view showing a structure of a buffer element according to a second embodiment of the present invention.
Figure 3:
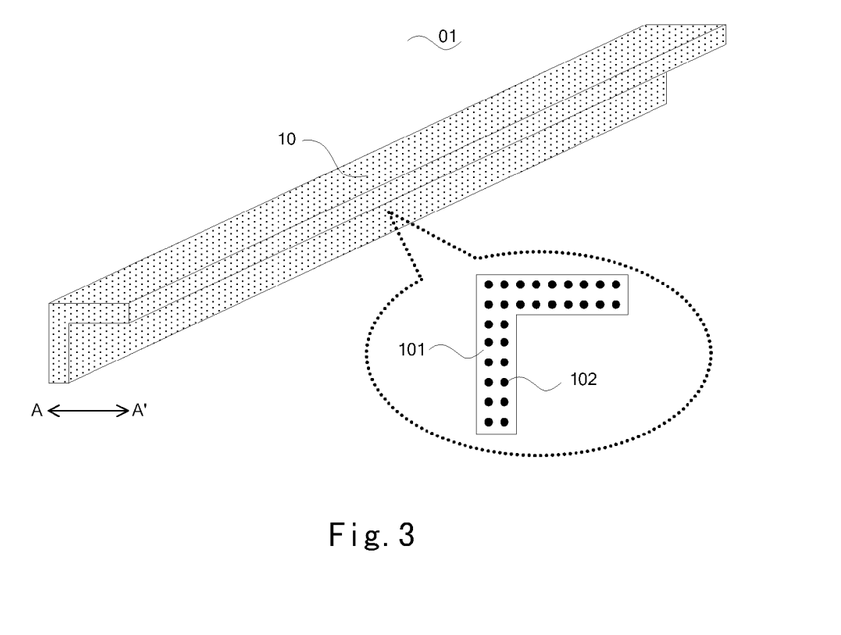
FIG. 3 is a schematic view showing a structure of a buffer element according to a third embodiment of the present invention.

Alternatively, referring to FIGS. 2-3, the buffer body 10 may have a base wall and a sidewall and may be in a shape of an elongated strip and the cross section of the buffer body taken in the direction A-A' in FIGS. 2-3 as shown by the broken line has an L shape or an inverted L shape.

Figure 4:
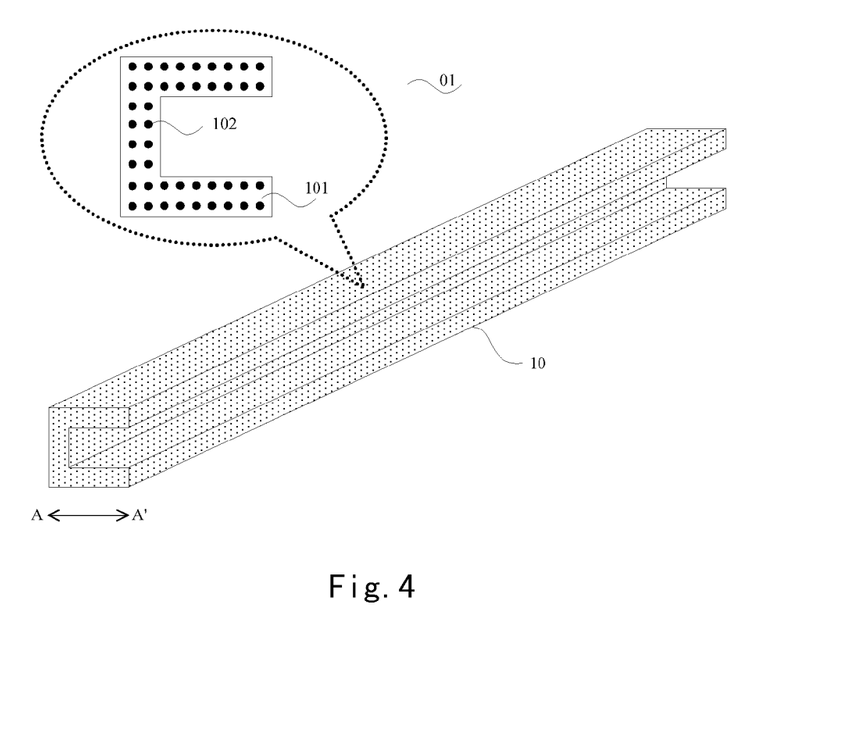
FIG. 4 is a schematic view showing a structure of a buffer element according to a fourth embodiment of the present invention.

Alternatively, referring to FIG. 4, for example, the buffer body 10 may have a base wall and two opposite sidewalls which extend in a length direction of the buffer body and may be in a shape of an elongated strip, and the cross section of the buffer body taken in the direction A-A' in FIG. 4 as shown by the broken line has a U shape.

It should be understood by those skilled in the art that the figures shown in the broken lines in FIGS. 1-4 are only intended to clearly illustrate the curable adhesive 101 and the negative thermal expansion material 102 constituting the buffer body 10, but do not define the dispersing situations of the negative thermal expansion material 102. The negative thermal expansion material 102 may be uniformly dispersed in the curable adhesive 101, or may be non-uniformly dispersed in the curable adhesive 101. The dispersing of the negative thermal expansion material can be determined according to the heated conditions of the material to be protected.

In addition, surfaces of the buffer body 10 may be flat surfaces or uneven surfaces and are not limited herein.

According to some embodiments, there is provided a buffer element 01 comprising the buffer body 10. The buffer body 10 comprises the curable adhesive 101, and the negative thermal expansion material 102 dispersed in the curable adhesive 101.

Figure 5:
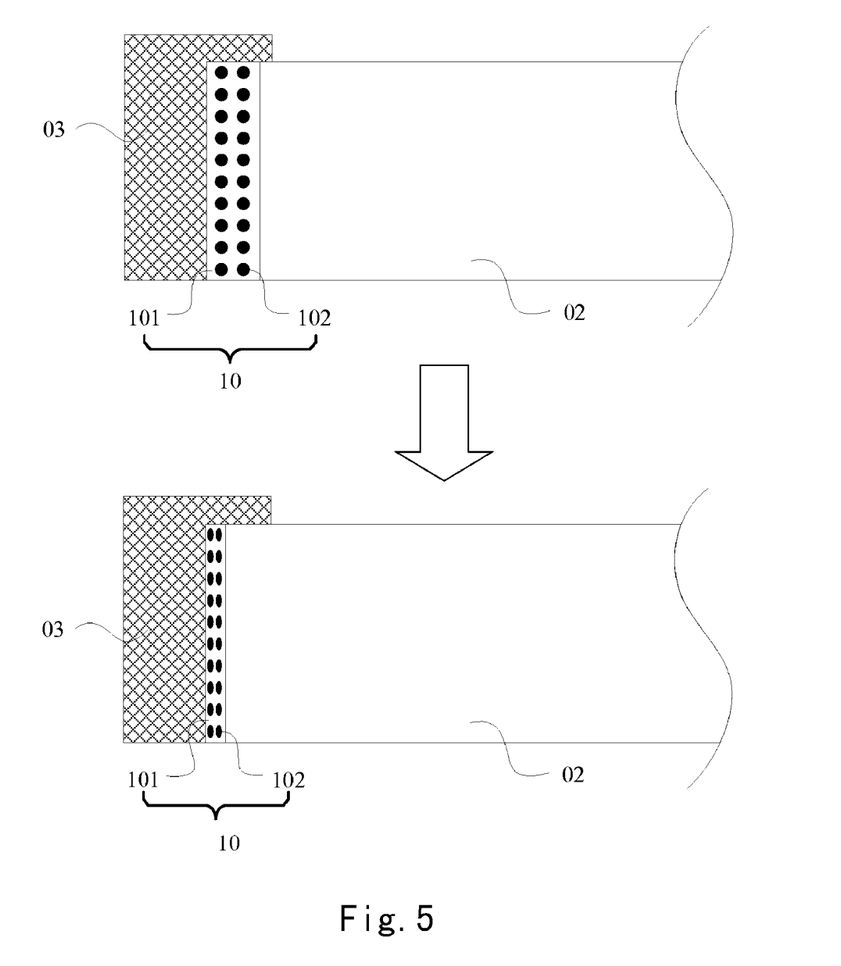
FIG. 5 is a schematic view showing a structure of a backlight module to which the buffer element shown in FIG. 1 is applied.

In this way, as shown in FIG. 5, in the backlight module to which the buffer element 01 (not shown in FIG. 5) is applied, after an ambient temperature in the backlight module rises, the buffer element 01 contracts because it is heated and thus decreases in volume. A gap is equivalently generated in the backlight module. The volume of the gap is equal to a volume $\Delta V$ by which the buffer element 01 decreases in volume. As a result, after the light guide plate 02 expands when heated and thus increases in volume, the gap $\Delta V$ generated by the contraction of the volume of the buffer element 01 can provide a space for the light guide plate 02 to be deformed and extended therein due to expansion of the light guide plate 02. The buffer element avoids warp of the light guide plate 02 due to constraint of the frame 03 on the light guide plate so as to effectively improve the thermal stability of the entire backlight module.

In addition, when the buffer element 01 is applied to the backlight module, it is in contact with the light guide plate 02. In other words, the position of the light guide plate 02 in the backlight module is relatively fixed so that the light guide plate cannot move in the up-down direction and left-right direction. As a result, the buffer element avoids the fluctuation of the optical quality of the backlight module.

Based on the above embodiments, according to the different curing principles of the curable adhesive 101, the curable adhesive 101 may be for example a UV curable adhesive or a thermal curable adhesive.

The UV curable adhesive can absorb the energy of ultraviolet radiation when irradiated with the ultraviolet radiation, and thus generate active free radicals or cation so that a series of chemical reactions occur in the curable adhesive and finally the curable adhesive is cured.

For the thermal curable adhesive such as thermoset phenol-formaldehyde resin, after the liquid curable adhesive is heated, chemical change is generated in the curable adhesive so that the curable adhesive is gradually cured and shaped. When the cured curable adhesive is heated again, it will not be softened.

In consideration of convenience and fastness of curing of the UV curable adhesive, in some embodiments, the curable adhesive 101 is preferably the UV curable adhesive.

The ratio ($\alpha$) of the mass of the negative thermal expansion material 102 to the volume of the UV curable adhesive 101 is within the range of 1 g/10 mL-1 g/3 mL.

It can be known from the definition of the mass-to-volume ratio $\alpha$ that the more the value of the ratio $\alpha$ is, the more the mass of the negative thermal expansion material 102 in per unit volume of the UV curable adhesive 101 is, and thus the more the volume $\Delta V$ by which the buffer element 01 decreases in volume after contracting when heated is. In contrast, the less the value of the ratio $\alpha$ is, the less the mass of the negative thermal expansion material 102 in per unit volume of the UV curable adhesive 101 is, and thus the less the volume $\Delta V$ by which the buffer element 01 decreases in volume after contracting when heated is.

The value of the mass-to-volume ratio $\alpha$ should be flexibly adjusted according to the thermal coefficient of expansion of the light guide plate corresponding to the buffer element 01. In other words, the light guide plate expands when heated to increase in volume, and the amount by which the buffer element 01 decreases in volume after contracting when heated should match the volume increment of the light guide plate to the maximum extent. If the amount by which the buffer element 01 decreases in volume after contracting when heated is too small, the effect of buffering the increase in volume of the light guide plate is not good; and if the amount by which the buffer element 01 decreases in volume after contracting when heated is too large, the mass of the negative thermal expansion material 102 in per unit volume of the UV curable adhesive 101 is too large, thereby increasing the manufacturing cost of the buffer element 01.

In addition, currently most of the light guide plates are made of PC material or PMMA material. The thermal coefficient of expansion of the PC material is $4\times10^{-5} K^{-1}$ (K is a unit of the temperature and represents the degree kelvin), and the thermal coefficient of expansion of the PMMA material is $6\times10^{-5} K^{-1}$. Therefore, when the negative thermal coefficient of expansion of the selected negative thermal expansion material is in the same order of magnitude as those of the abovementioned two materials, the buffering effect of the buffer element 01 on the expansion of the light guide plate when heated is relatively optimal. Furthermore, the temperature range in which the selected negative thermal expansion material contracts when heated meets the working temperature range of $-20$ to $50°$ C. of the display device.

Therefore, in some embodiments, the negative thermal expansion material 102 is a negative thermal expansion alloy material or a negative thermal expansion inorganic material.

If the negative thermal expansion material 102 is a negative thermal expansion alloy material, the negative thermal expansion alloy material may be NiTi and/or FeNiCo.

If the negative thermal expansion material 102 is a negative thermal expansion inorganic material, the negative thermal expansion inorganic material may be at least one of $Zr_2W_2O_8$, $ZrMo_2O_8$, $ZrV_2O_7$, or $Cd(CN)_2$.

Figure 6A:
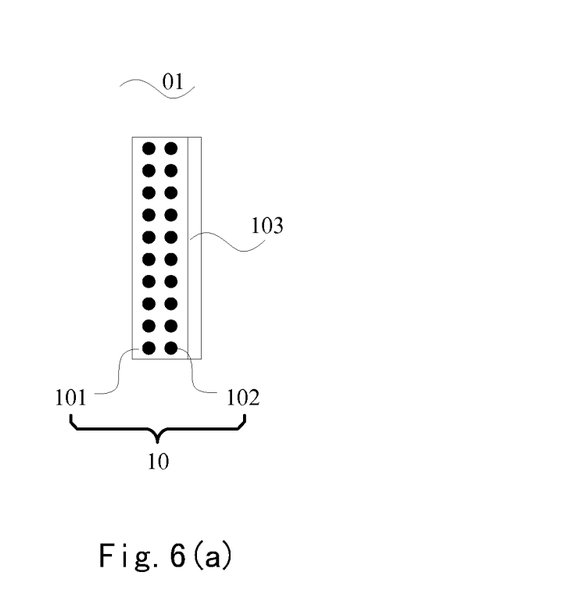
FIG. 6(a) is a schematic cross sectional view showing a structure of a buffer element according to a fifth embodiment of the present invention.
Figure 7A:
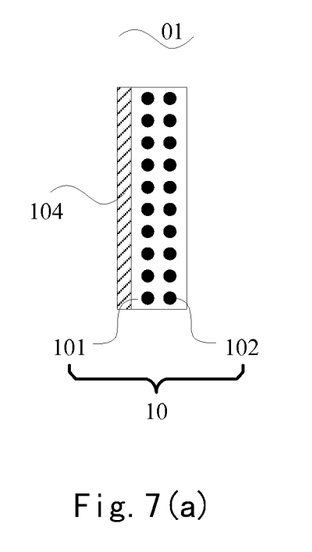
FIG. 7(a) is a schematic cross sectional view showing a structure of a buffer element according to a sixth embodiment of the present invention.
Figure 8A:
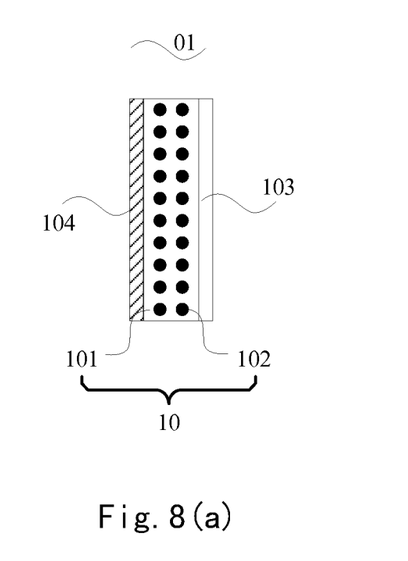
FIG. 8(a) is a schematic cross sectional view showing a structure of a buffer element according to a seventh embodiment of the present invention.

Based on the abovementioned embodiments, as shown in FIGS. 6(a), 7(a), and 8(a), the buffer element 01 may further comprise a light reflection layer 103 and/or an adhesive layer 104.

As shown in FIG. 6(a) or 7(a), the light reflection layer 103 or the adhesive layer 104 is disposed along a longitudinal extending direction of the buffer body 10 on one side of the buffer body 10.

Alternatively, as shown in FIG. 8(a), the light reflection layer 103 and the adhesive layer 104 are disposed along the longitudinal extending direction of the buffer body 10 on both sides of the buffer body 10, respectively.

It is to be noted that FIGS. 6(a), 7(a), and 8(a) are only intended to take the buffer body 10 in the shape of the elongated strip as an example for illustration, and the shape of the buffer body 10 is not limited to those shown in FIGS. 6(a), 7(a), and 8(a).

Figure 6B:
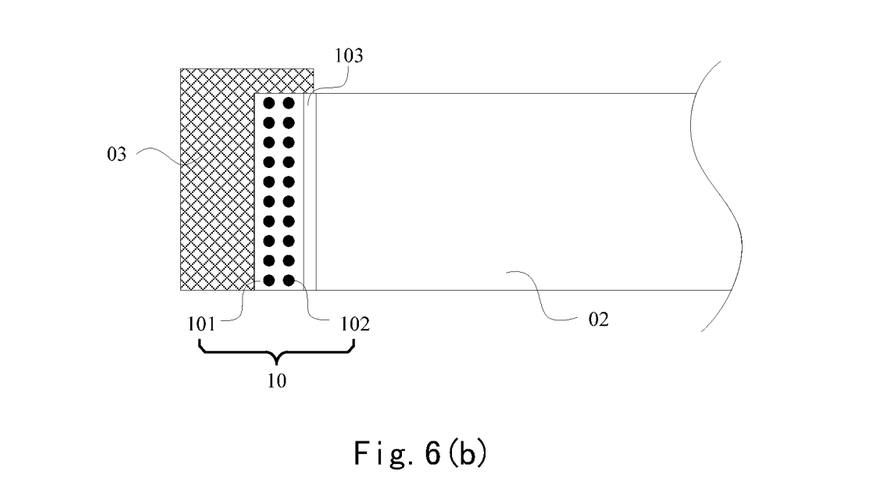
FIG. 6(b) is a schematic view showing a structure of a backlight module to which the buffer element shown in FIG. 6(a) is applied.

Those skilled in the art would appreciate that the buffer element 01 should be disposed on a non-light incident surface of the light guide plate to buffer the increase in volume of the light guide plate due to expansion when heated. Therefore, since the negative thermal expansion material 102 constituting the buffer body 10 is usually not a while powder or particle material. When the buffer body 10 is in direct contact with the non-light incident surface of the light guide plate 02, it may absorb a certain light energy, thereby decreasing the light efficiency at the edge of the light guide plate 02. Therefore, as shown in FIG. 6(b), the light reflection layer 103 is disposed on one side of the buffer body 10 such that the light reflection layer 103 faces the light guide plate 02, thereby improving the light efficiency of the light guide plate 02 and increasing light diffusing efficiency at the edge of the light guide plate 02. It can be understood that when the element to be protected is an optical element, a light reflection layer is disposed on one side of the buffer body in order not to adversely affect the optical effect of the element to be protected.

Figure 7B:
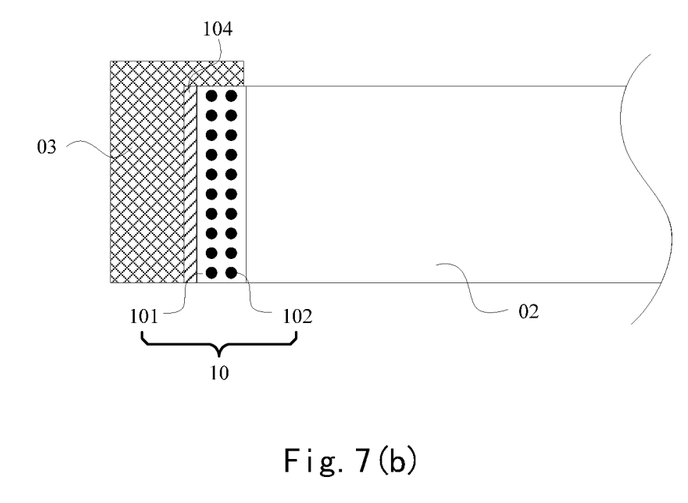
FIG. 7(b) is a schematic view showing a structure of a backlight module to which the buffer element shown in FIG. 7(a) is applied.

As shown in FIG. 7(b), since the light guide plate 02 needs to be positioned by the frame 03, an adhesive layer 104 is disposed on a side of the buffer body 10. The adhesive layer 104 can improve the steadiness of the buffer element 01 and the frame 03 and facilitate the manufacturing and assembling of the backlight module, and further avoid the light guide plate 02 from shaking in the backlight module to affect the optical quality.

Figure 8B:
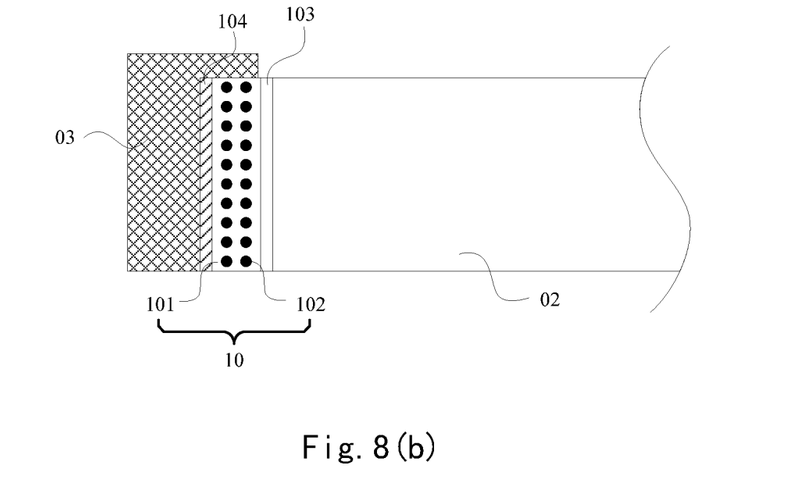
FIG. 8(b) is a schematic view showing a structure of a backlight module to which the buffer element shown in FIG. 8(a) is applied.

Referring to FIG. 8(b), as described above, the light reflection layer 103 and the adhesive layer 104 are disposed along the longitudinal extending direction of the buffer body 10 on both sides of the buffer body 10 respectively, so that the buffer element 01 is stably fixed inside the frame 03 while the light efficiency of the light guide plate 02 can also be improved.

Furthermore, the light reflection layer 103 is preferably a white light reflection layer, and the white light reflection layer comprises an adhesive, and $BaSO_4$ and/or $CaCO_3$ dispersed in the adhesive.

In addition, the light reflection layer 103 has a thickness of 1-50 μm. This thickness can optimally ensure the light reflection effect of the light reflection layer 103 and does not affect the contraction of the buffer body 10 when heated.

Moreover, when the adhesive layer 104 has a certain color, it may absorb the light energy of the light at the non-light incident surface of the light guide plate. In consideration of this, preferably, the adhesive layer 104 is a transparent adhesive layer.

According to embodiments of the present invention, there is provided a method of manufacturing the abovementioned buffer element 01. The buffer element 01 comprises the buffer body 10. The buffer body 10 is formed by:

step S01: dispersing a negative thermal expansion material 102 in a curable adhesive 101;

step S02: filling into a mold the curable adhesive 101 with the negative thermal expansion material 102, and curing the curable adhesive 101; and step S03: separating the cured curable adhesive 101 from the mold to obtain the buffer body 10.

In this case, since the mold has a shape, the finally obtained buffer body 10 also has the same shape as the mold.

In consideration of convenience and fastness of curing of the UV curable adhesive, in the embodiments, the curable adhesive 101 is preferably the UV curable adhesive. In this case, the step S02 may specifically comprises the following two sub-steps:

firstly, filling the UV curable adhesive 101 with the negative thermal expansion material 102 into the mold made of quartz glass; and then, exposing the mold in which the UV curable adhesive is filled to ultraviolet radiation and heating the mold to cure the UV curable adhesive 101.

It is to be noted that the different common glasses have different components, they absorb the ultraviolet radiation to a certain extent. The mold made of the common glass will reduce the curing efficiency of the UV curable adhesive 101. Therefore, in the embodiments of the present invention, preferably, the mold is made of the quartz glass (containing only a single component of silicon dioxide) having extremely low thermal coefficient of expansion and optimal ultraviolet radiation transmittance, and is adopted to mold the UV curable adhesive 101.

Furthermore, as shown in FIGS. 6(a), 7(a), and 8(a), the manufacturing method further comprises the step of forming the light reflection layer 103 or the adhesive layer 104 along a longitudinal extending direction of the buffer body 10 on one side of the buffer body 10; or, forming the light reflection layer 103 and the adhesive layer 104 along the longitudinal extending direction of the buffer body 10 on both sides of the buffer body 10, respectively.

In addition, the light reflection layer 103 is a white light reflection layer, and the white light reflection layer comprises an adhesive, and $BaSO_4$ and/or $CaCO_3$ dispersed in the adhesive.

Preferably, the adhesive layer 104 is a transparent adhesive layer.

A specific example is provided below for describing the manufacturing process in detail.

At step S11, the negative thermal expansion material 102 and the liquid UV curable adhesive 101 are mixed at a mass-to-volume ratio α of 1 g/3 mL.

At step S12: the UV curable adhesive 101 mixed with the negative thermal expansion material 102 is placed in an ultrasonic disperser to ultrasonically disperse the negative thermal expansion material 102 for an hour such that the negative thermal expansion material 102 is uniformly dispersed in the liquid UV curable adhesive 101.

At step S13, the uniformly dispersed mixed liquid is filled into the mold made of quartz glass from an opening of the mold.

At step S14, the mold in which the mixed liquid is filled is exposed to ultraviolet radiation and rotated while the mold is heated at a temperature of 60° C. for 60 seconds.

In this case, the mold in which the mixed liquid is filled is rotated by a relevant apparatus. The effect of rotation of the mold is that the negative thermal expansion material 102 is more uniformly dispersed in the UV curable adhesive 101 during gradual curing of the UV curable adhesive 101.

The effect of heating of the mold is to slightly reduce the volume of the cured UV curable adhesive 101 to facilitate quick separation of the curable adhesive 101 from the mold.

At step S15, the cured UV curable adhesive 101 is separated from the mold from the opening of the mold to obtain the buffer body 10

At step 16, the transparent adhesive layer 104 is stuck on one side of the buffer body 10 along the longitudinal extending direction of the buffer body 10, and the white light reflection layer 103 is formed on the other side of the buffer body 10 along the longitudinal extending direction of the buffer body 10 by spray coating.

The transparent adhesive layer 104 may be made for example by applying a water-based acrylic ester pressure-sensitive adhesive emulsion to a stretched polypropylene film.

The white light reflection layer 103 comprises white poly(vinyl alcohol) aqueous solution adhesive, and nano-scale particles of $BaSO_4$ and/or $CaCO_3$ dispersed in the poly(vinyl alcohol) aqueous solution adhesive.

In addition, in order to ensure the buffering effect of the buffer element 01, the thickness of the white light reflection layer 103 is controlled within the range of 1-50 μm.

Figure 9:
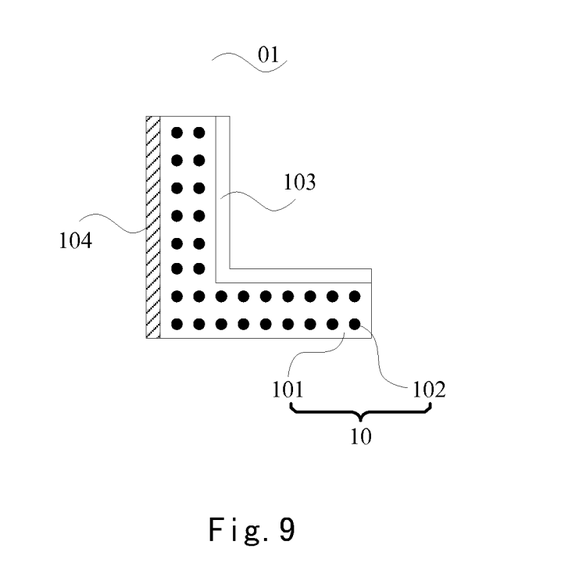
FIG. 9 is a schematic cross sectional view showing a structure of a buffer element according to an eighth embodiment of the present invention.
Figure 10:
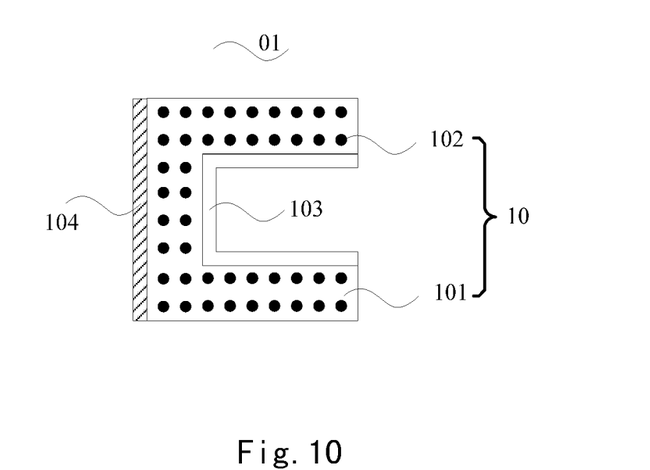
FIG. 10 is a schematic cross sectional view showing a structure of a buffer element according to a ninth embodiment of the present invention.

Specifically, as shown in FIG. 9, if the cross section of the buffer body 10 has an L shape, the white light reflection layer 103 is applied, by spraying, on one side of the buffer body 10 in the L shape, or one side of the L shape, or the surfaces of the buffer body 10 in contact with the light guide plate. As shown in FIG. 10, if the cross section of the buffer body 10 has a U shape, the white light reflection layer 103 is applied, by spraying, on one side of the buffer body 10 in the U shape, or one side of the U shape, or the surfaces of the buffer body 10 in contact with the light guide plate.

Figure 11:
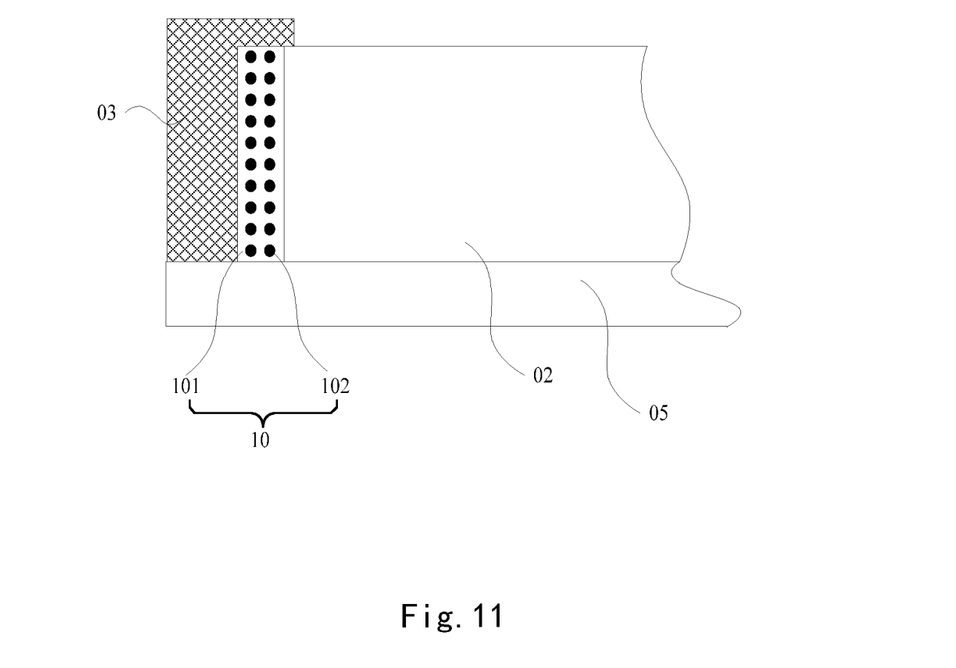
FIG. 11 is a schematic view showing a structure of a backlight module according to a tenth embodiment of the present invention.
Figure 12:
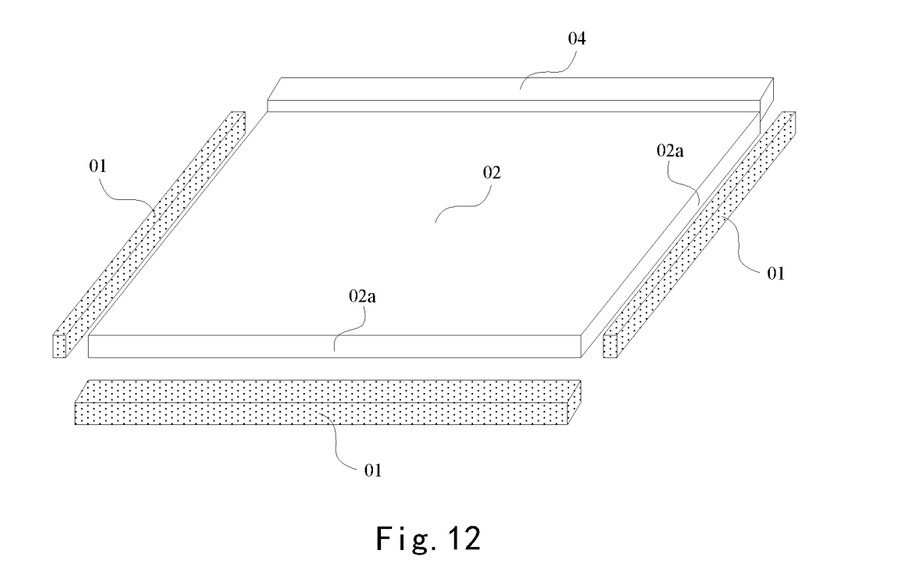
FIG. 12 is a schematic view showing a relationship between a light guide plate and buffer elements in a backlight module according to an embodiment of the present invention.

According to embodiments of the present invention, there is provided a backlight module. As shown in FIGS. 11 and 12, the backlight module comprises a back plate 05, and a light guide plate 02 disposed above the back plate 05. The light guide plate comprises at least one non-light incident side 02a and the backlight module further comprises the abovementioned buffer element 01.

The buffer element 01 is disposed near the at least one non-light incident side 02a of the light guide plate 02 and is in contact with the non-light incident side 02a of the light guide plate.

It is to be noted that FIG. 12 is only intended to schematically illustrate the relative relationship between the buffer element 01 and the light guide plate 02, i.e., a situation where a light source 04 is disposed at one side of the light guide plate 02. The buffer element 01 may be in contact with one, two, or three of the non-light incident sides 02a of the light guide plate 02. Of course, in the situation where the light source 04 is disposed at one side of the light guide plate 02, if the buffer element 01 is in contact with the three non-light incident sides 02a of the light guide plate 02, it can buffers, to the maximum extent, the warp of the light guide plate 02 due to expansion in volume when heated.

In addition, the light guide plate 02 further comprises a bottom surface 02b facing the back plate 05 and a top surface 02c opposite to the bottom surface 02b. The buffer element 01 is also in contact with regions, closing to an edge of the non-light incident side 02a, of the bottom surface 02b and/or the top surface 02c.

Figure 13:
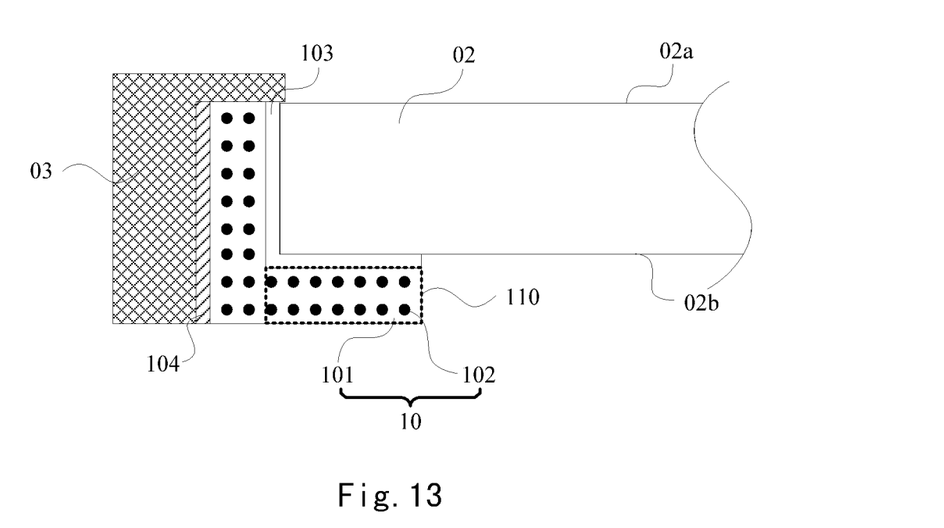
FIG. 13 is a schematic view showing a structure of a backlight module according to an eleventh embodiment of the present invention.

Specifically, in the first situation, as shown in FIG. 13, the buffer body 10 further comprises the first sidewall 110 connected to the buffer body 10 and extending to the lower side of the bottom surface 02b. In other words, the cross section of the buffer body 10 has the L shape.

In this way, the buffer body can buffer not only expansion of the light guide plate 02 in the horizontal direction (i.e., in an extending direction of a plane in which the light guide plate is located) but also expansion of the bottom surface 02b of the light guide plate 02 in the vertical direction (i.e., a normal direction perpendicular to the extending direction) when the light guide plate is heated.

Figure 14:
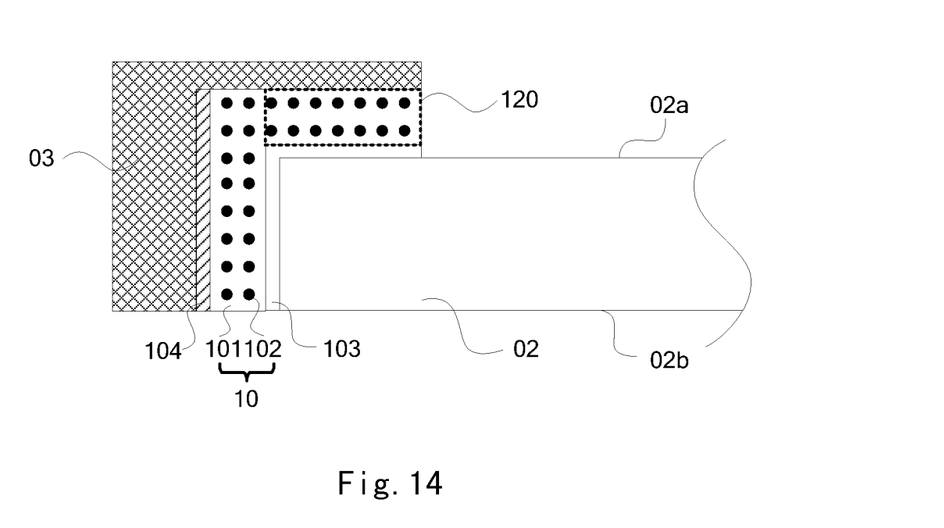
FIG. 14 is a schematic view showing a structure of a backlight module according to a twelfth embodiment of the present invention.

In the second situation, as shown in FIG. 14, the buffer body 10 further comprises the second sidewall 120 connected to the buffer body 10 and extending to the upper side of the top surface 02c. In other words, the cross section of the buffer body 10 has the inverted L shape.

In this way, the buffer body can buffer not only expansion of the light guide plate 02 in the horizontal direction (i.e., in the extending direction of the plane in which the light guide plate is located) but also expansion of the top surface 02c of the light guide plate 02 in the vertical direction (i.e., the normal direction perpendicular to the extending direction) when the light guide plate is heated.

Figure 15:
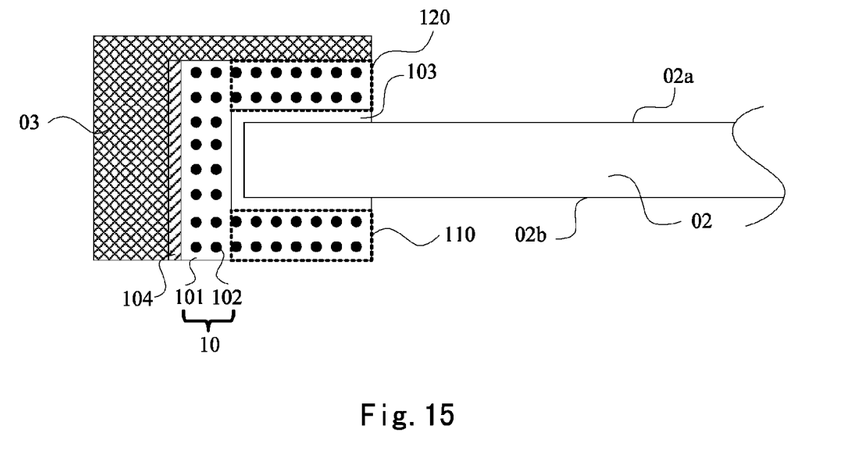
FIG. 15 is a schematic view showing a structure of a backlight module according to a thirteenth embodiment of the present invention.

In the third situation, as shown in FIG. 15, the buffer body 10 further comprises the first sidewall 110 connected to the buffer body 10 and extending to the lower side of the bottom surface 02b and the second sidewall 120 connected to the buffer body 10 and extending to the upper side of the top surface 02c. In other words, the cross section of the buffer body 10 has the U shape.

In this way, the buffer body can buffer not only expansion of the light guide plate 02 in the horizontal direction (i.e., in the extending direction of the plane in which the light guide plate is located) but also expansions of the top surface 02c and of the bottom surface 02b of the light guide plate 02 in the vertical direction (i.e., the normal direction perpendicular to the extending direction) when the light guide plate is heated.

Furthermore, the buffer element 01 further comprises a light reflection layer 103 and/or an adhesive layer 104.

As shown in FIG. 6(a) or 7(a), the light reflection layer 103 or the adhesive layer 104 is disposed along the longitudinal extending direction of the buffer body 10 on a side of the buffer body 10, and the adhesive layer 104 is disposed on the side of the buffer body 10 away from the non-light incident side 02a.

Alternatively, as shown in FIGS. 13-15, the light reflection layer 103 and the adhesive layer 104 are disposed along the longitudinal extending direction of the buffer body 10 on both sides of the buffer body 10, respectively, and the adhesive layer 104 is disposed on the side of the buffer body 10 away from the non-light incident side 02a.

In addition, referring to FIG. 11, the backlight module further comprises the frame 03 disposed around the light guide plate 02. The frame 03 is in contact with the adhesive layer 104. The adhesive layer 104 can improve the steadiness of the buffer element 01 and the frame 03 and facilitate the manufacturing and assembling of the backlight module, and further avoid the light guide plate 02 from shaking in the backlight module to adversely affect the optical quality.

Furthermore, the light reflection layer 103 is preferably a white light reflection layer, and the white light reflection layer comprises an adhesive, and $BaSO_4$ and/or $CaCO_3$ dispersed in the adhesive.

In addition, the light reflection layer 103 has a thickness of 1-50 μm. This thickness can optimally ensure the light reflection effect of the light reflection layer 103 and does not affect the contraction of the buffer body 10 when heated.

Moreover, when the adhesive layer 104 has a certain color, it may absorb the light energy of the light at the non-light incident surface of the light guide plate. In consideration of this, preferably, the adhesive layer 104 is a transparent adhesive layer.

According to embodiments of the present invention, there is provided a display device comprising the abovementioned buffer element or the abovementioned backlight module.

It is to be noted that all of the drawings are curt schematic diagrams of the buffer element, backlight module, and display device and only intended to illustrate structures relevant to the general inventive concept of the present invention. The other structures are partly shown or not shown in the drawings.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

The invention claimed is:

1. A backlight module, comprising:
a back plate;
a light guide plate disposed above the back plate, wherein the light guide plate comprises at least one non-light incident side; and
a buffer element,
wherein:
the buffer element is disposed adjacent to the at least one non-light incident side of the light guide plate and is in contact with the at least one non-light incident side of the light guide plate, and
the buffer element comprises:
a buffer body, wherein the buffer body comprises a curable adhesive, and a negative thermal expansion material dispersed in the curable adhesive such that the buffer element contracts when heated so as to provide a space for the light guide plate to expand therein while the buffer element is in contact with the at least one non-light incident side of the light guide plate.

2. The backlight module of claim 1, wherein:
the curable adhesive comprises a UV curable adhesive or a thermal curable adhesive.

3. The backlight module of claim 2, wherein:
a ratio of a mass of the negative thermal expansion material to a volume of the UV curable adhesive is within the range of 1 g/10 mL-1 g/3 mL.

4. The backlight module of claim 1, wherein:
the negative thermal expansion material comprises a negative thermal expansion alloy material or a negative thermal expansion inorganic material.

5. The backlight module of claim 1, wherein:
the negative thermal expansion material comprises a negative thermal expansion alloy material, and the negative thermal expansion alloy material comprises at least one of NiTi or FeNiCo.

6. The backlight module of claim 1, wherein:
the negative thermal expansion material comprises a negative thermal expansion inorganic material, and the negative thermal expansion inorganic material comprises at least one of $Zr_2W_2O_8$, $ZrMo_2O_8$, $ZrV_2O_7$, or $Cd(CN)_2$.

7. The backlight module of claim 1, further comprising:
a light reflection layer and/or an adhesive layer,
wherein the light reflection layer or the adhesive layer is disposed along a longitudinal extending direction of the buffer body on one side of the buffer body, or, the light reflection layer and the adhesive layer are disposed along the longitudinal extending direction of the buffer body on both sides of the buffer body, respectively.

8. The backlight module of claim 7, wherein:
the light reflection layer is a white light reflection layer, and the white light reflection layer comprises an adhesive, and $BaSO_4$ and/or $CaCO_3$ dispersed in the adhesive.

9. The backlight module of claim 7, wherein:
the light reflection layer has a thickness of 1-50 μm.

10. The backlight module of claim 7, wherein:
the adhesive layer is a transparent adhesive layer.

11. The backlight module of claim 1, wherein:
the buffer element further comprises a light reflection layer and/or an adhesive layer;
wherein the light reflection layer or the adhesive layer is disposed along a longitudinal extending direction of the buffer body on one side of the buffer body, or, the light reflection layer and the adhesive layer are disposed along the longitudinal extending direction of the buffer body on both sides of the buffer body, respectively; and
wherein the adhesive layer is disposed on the side of the buffer body away from the non-light incident side.

12. The backlight module of claim 11, wherein:
the light reflection layer is a white light reflection layer, and the white light reflection layer comprises an adhesive, and $BaSO_4$ and/or $CaCO_3$ dispersed in the adhesive.

13. The backlight module of claim 11, wherein:
the light reflection layer has a thickness of 1-50 μm.

14. The backlight module of claim 11, wherein:
the adhesive layer is a transparent adhesive layer.

15. The backlight module of claim 11, wherein:
the backlight module further comprises a frame disposed around the light guide plate, wherein the frame is in contact with the adhesive layer.

16. The backlight module of claim 1, wherein:
the light guide plate further comprises a bottom surface facing the back plate and a top surface opposite to the bottom surface; and
the buffer element is also in contact with regions, closing to an edge of the non-light incident side, of the bottom surface and/or the top surface; and
wherein the buffer body further comprises a first sidewall connected to the buffer body and extending to a lower side of the bottom surface, and/or, a second sidewall connected to the buffer body and extending to an upper side of the top surface.

17. A display device, comprising the backlight module according to claim 1.

* * * * *

UNITED STATES PATENT AND TRADEMARK OFFICE
CERTIFICATE OF CORRECTION

PATENT NO. : 9,625,643 B2
APPLICATION NO. : 14/313600
DATED : April 18, 2017
INVENTOR(S) : Gang Liu It is certified that error appears in the above-identified patent and that said Letters Patent is hereby corrected as shown below:

Column 9, Line 65 insert paragraph:
-- In order to simplify the process, the buffer body 10 further comprises a first sidewall 110 connected to the buffer body 10 and extending to a lower side of the bottom surface 02b, and/or a second sidewall 120 connected to the buffer body 10 and extending to an upper side of the top surface 02c. --

Signed and Sealed this
Seventeenth Day of April, 2018

Andrei Iancu
*Director of the United States Patent and Trademark Office*